Mar. 3, 1925. 1,528,563

A. C. PATZER

AUTOMOBILE LOCK DEVICE

Filed May 8, 1924

Inventor
A. C. Patzer
By Jary A. Mathews
Attorney

Patented Mar. 3, 1925.

1,528,563

UNITED STATES PATENT OFFICE.

AUGUST C. PATZER, OF MARENGO, WISCONSIN.

AUTOMOBILE LOCK DEVICE.

Application filed May 8, 1924. Serial No. 711,887.

*To all whom it may concern:*

Be it known that I, AUGUST C. PATZER, a citizen of the United States, residing at Marengo, in the county of Ashland and State of Wisconsin, have invented certain new and useful Improvements in Automobile Lock Devices, of which the following is a specification.

My invention relates to a lock device for connection with the lever and pedal of an automobile, or like operating parts, for holding them against shifting movement, whereby it will be impossible for the unauthorized operator of the automobile, to drive the same.

An important object of the invention is to provide a device of the above mentioned character, which is extremely simple in construction, and convenient in use.

A further object of the invention is to provide a device of the above mentioned character, which may be used in connection with various types of automobiles.

Other objects and advantages of the invention will be apparent during the course of the following description.

In the accompanying drawings forming a part of this specification, and in which like numerals are employed to designate like parts throughout the same, Figure 1 is a perspective view of a lock device embodying my invention, showing the same in use.

Figure 1:
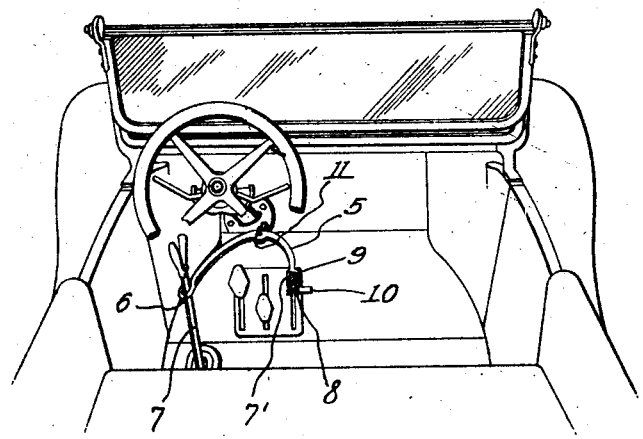
Figure 2:
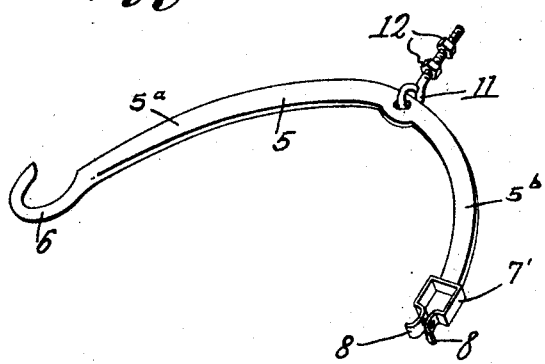
Figure 2 is a perspective view of the device removed.

In the drawings, wherein for the purpose of illustration is shown a preferred embodiment of my invention, the lock device is shown as comprising a curved or generally U-shaped body portion 5, which is preferably rigid. This body portion embodies outwardly diverging arms 5ª and 5ᵇ. The arm 5ª is provided at its free end with a hook 6, which is adapted to engage behind and around the brake lever 7 of a Ford automobile. The arm 5ᵇ is provided upon its free end with a socket 7, the sides of which are resilient and embodying outwardly bent guide fingers 8. These guide fingers are adapted to receive therebetween the brake pedal 9 of the Ford automobile. These resilient fingers are apertured for the reception of the shackle of the pad lock 10, of any well known or preferred construction.

The intermediate portion of the body portion 5 is apertured for the reception of an eye bolt 11, carrying a pair of nuts 12. This eye bolt is passed through an opening formed in the bottom portion of the automobile and is clamped therein by the nuts 12. The nuts are employed so that the eye bolt may be longitudinally adjusted, so that the device may be adjustable within limits, to take care of automobiles varying in size. Any other suitable means may be employed to prevent the improper removal of the eye bolt.

In the use of this form of the device, the brake lever 7 is moved to the forwardmost position, whereby the gears are thrown into high. The operator then presses the brake pedal forwardly, and it will pass between the resilient fingers 8. The shackle of the lock is then passed through the apertures in these fingers and the brake pedal is locked in the forward position. The car is therefore placed in high gear and also has the brakes applied. Under these conditions it would be impossible to start the engine, and to drive it if started.

Figure 3:
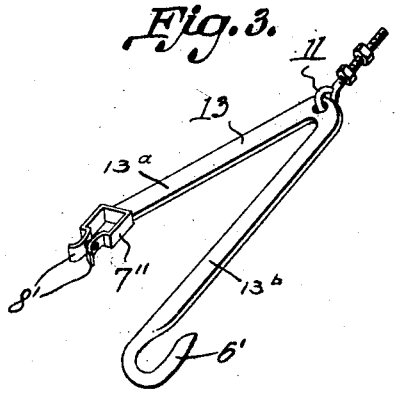
Figure 3 is a similar view of a modification.

In Figure 3, I have shown a modification of the device, which I contemplate employing upon types of automobiles, other than Ford automobiles. In this device, I provide a generally V-shaped body portion 13, embodying arms 13ª and 13ᵇ. Upon the arm 13ª I place the resilient socket 7', having the curved resilient fingers 8', which are apertured to receive the shackle of the lock. On the other arm 13ᵇ I provide a hook 6'. The same eye bolt 12 is employed to attach the device to the floor or bottom of the automobile. In connection with an automobile of the standard shift gear, the socket 7' would receive the clutch pedal, when it is shifted forwardly to the released position, and hence lock it in this released position. This socket could also receive the brake pedal, when shifted to the forward active position. The hook 6 is adapted to engage behind or over the control lever when it is shifted forwardly, such as to the left and forwardly, to throw the gears into reverse. It is obvious that the device would then lock the pedal and shift the lever so that it would be impossible to start the automobile, or drive it if started.

I also contemplate passing the loop or shackle of the pad lock exteriorly of and around the resilient curved fingers 8 and 8', rather than through the aperture thereof. This loop could not be removed from the fingers without opening the loop, as it would be of a suitable size for this purpose.

It is obvious that in attaching the device to different types of automobiles, the arms of the body portion may be made of different lengths, and different distances apart, and that other changes may be resorted to, without departing from the spirit of the invention or the scope of the subjoined claims.

Having thus described my invention, I claim:

1. A lock device for an automobile, comprising a body portion provided with a hook to engage with a lever and having a resilient socket for receiving a pedal, a lock to retain the pedal in the resilient socket, and means engaging the body portion between its ends to permanently attach the body portion to a portion of the automobile.

2. A lock device for automobiles, comprising a body portion provided near one end with a hook for engagement with a lever of the automobile, a resilient socket carried by the opposite end portion of the body portion and having its sides apertured, said resilient socket being adapted for the reception of a pedal, a lock having its shackle adapted for insertion through the apertures of the sides of the socket, and means engaging the body portion between its ends for connecting the body portion to a part of the automobile.

3. In a lock device for automobiles, comprising a body portion including outwardly diverging arms, one arm having a hook to engage with a lever of the automobile, a resilient socket carried by the other arm and having its sides apertured for the reception of the shackle of the lock, said resilient socket being adapted to receive a pedal of the automobile, and a bolt connected with the forward end of the body portion and adapted to be secured to the bottom of the automobile in advance of the lever and pedal.

4. A lock device for an automobile, comprising a body portion including a pair of arms, a hook carried by one arm, a socket carried by the other arm, a lock to close the socket, a bolt secured to the forward end of the body portion, and means to longitudinally adjustably connect the bolt with the body portion of the automobile and to hold the same thereto in a selected adjusted position.

In testimony whereof I affix my signature.

AUGUST C. PATZER.